(12) United States Patent
Roberts

(10) Patent No.: US 11,168,834 B2
(45) Date of Patent: Nov. 9, 2021

(54) REVERSIBLE BRACKET

(71) Applicant: Victaulic Company, Easton, PA (US)

(72) Inventor: Clancy P. Roberts, Milton (CA)

(73) Assignee: Victaulic Company, Easton, PA (US)

( * ) Notice: Subject to any disclaimer, the term of this patent is extended or adjusted under 35 U.S.C. 154(b) by 195 days.

(21) Appl. No.: 16/703,150

(22) Filed: Dec. 4, 2019

(65) Prior Publication Data

US 2020/0191325 A1 Jun. 18, 2020

Related U.S. Application Data

(60) Provisional application No. 62/780,483, filed on Dec. 17, 2018.

(51) Int. Cl.
*A47B 96/06* (2006.01)
*F16M 13/02* (2006.01)
*F16B 2/10* (2006.01)
*A62C 35/68* (2006.01)

(52) U.S. Cl.
CPC .............. *F16M 13/022* (2013.01); *F16B 2/10* (2013.01); *A62C 35/68* (2013.01)

(58) Field of Classification Search
CPC .......... F16L 3/24; F16L 3/1075; A62C 35/68; F16B 2/10; F16B 2/14; F16M 13/027; F16M 13/022
USPC ........................................ 248/214, 342, 343
See application file for complete search history.

(56) References Cited

U.S. PATENT DOCUMENTS

| 1,995,983 | A | 3/1935 | Hesse |
| 3,865,310 | A | 2/1975 | Elkins et al. |
| 4,436,266 | A | 3/1984 | Gerding |
| 4,717,099 | A | 1/1988 | Hubbard |
| 4,719,654 | A | 1/1988 | Blessing |
| 5,622,341 | A | 4/1997 | Stana |
| 5,799,907 | A | 9/1998 | Andronica |
| 5,842,526 | A | 12/1998 | Archer et al. |
| 6,138,960 | A | 10/2000 | Carbonare et al. |
| 6,260,810 | B1 | 7/2001 | Choi |
| 6,283,425 | B1 | 9/2001 | Liljevik |
| 6,345,800 | B1 | 2/2002 | Herst et al. |
| 6,450,465 | B1 | 9/2002 | Eslick |
| 6,554,231 | B2 | 4/2003 | Choi |
| 6,811,130 | B1 | 11/2004 | Oh |
| 7,255,315 | B2 | 8/2007 | Oh |
| 7,264,214 | B2 | 9/2007 | Oh |
| 7,373,720 | B1 | 5/2008 | Jensen et al. |
| 7,427,051 | B2 | 9/2008 | Oh |
| 7,506,845 | B2 | 3/2009 | Oh |
| 7,665,674 | B2 | 2/2010 | Kim |
| 7,735,787 | B2 * | 6/2010 | Kafenshtok ............ E04B 9/001 248/75 |
| 7,784,746 | B2 | 8/2010 | Kafenshtok et al. |

(Continued)

FOREIGN PATENT DOCUMENTS

CN 1289396 3/2001
KR 200440808 7/2008

*Primary Examiner* — Todd M Epps
(74) *Attorney, Agent, or Firm* — Ballard Spahr LLP

(57) ABSTRACT

A bracket defines a channel having narrow and wide channel portions. The narrow channel portion is sized to receive a cross member and prevent rotation of the bracket about the cross member. The wide channel portion is sized to receive the cross member and permit rotation of the bracket about the cross member.

19 Claims, 10 Drawing Sheets

(56) References Cited

U.S. PATENT DOCUMENTS

| | | |
|---|---|---|
| 7,845,599 B2 | 12/2010 | Jackson |
| 7,878,464 B2 | 2/2011 | Oh |
| 8,272,615 B2 * | 9/2012 | Silcox .................. E04B 9/0421 248/342 |
| 8,444,100 B2 | 5/2013 | Takahashi et al. |
| 8,474,199 B2 | 7/2013 | Oh |
| 8,500,079 B2 * | 8/2013 | Oh .......................... F16L 3/245 248/343 |
| RE45,399 E | 3/2015 | Kafenshtok et al. |
| 9,004,422 B2 * | 4/2015 | Feenstra ................. E04B 9/006 248/200.1 |
| 9,278,238 B2 * | 3/2016 | Thau, Jr. ................. F16L 3/245 |
| 9,526,934 B2 * | 12/2016 | Jung .................... F16M 13/027 |
| 9,889,327 B2 * | 2/2018 | Mitchell ................. F16L 3/245 |
| 10,016,644 B2 * | 7/2018 | Seo .......................... F16L 3/24 |
| 10,203,050 B2 * | 2/2019 | Jung ....................... F16L 3/003 |
| 2004/0046089 A1 | 3/2004 | Kirsschner |
| 2004/0143945 A1 | 7/2004 | Christianson |
| 2005/0139743 A1 | 6/2005 | Shim |
| 2006/0192067 A1 | 8/2006 | Oh |
| 2007/0063121 A1 | 3/2007 | Oh |
| 2008/0083852 A1 | 4/2008 | Oh |
| 2008/0083853 A1 | 4/2008 | Oh |
| 2008/0099640 A1 | 5/2008 | Kafenshtok et al. |
| 2008/0230238 A1 | 9/2008 | Jackson |
| 2010/0237201 A1 | 9/2010 | Oh |
| 2011/0094760 A1 | 4/2011 | Im |
| 2011/0155865 A1 | 6/2011 | Oh |
| 2011/0260012 A1 | 10/2011 | Oh |
| 2011/0284098 A1 | 11/2011 | Silcox |
| 2013/0048822 A1 | 2/2013 | Liu et al. |
| 2013/0105640 A1 | 5/2013 | Feenstra |
| 2013/0105641 A1 | 5/2013 | Feenstra |
| 2014/0333068 A1 | 11/2014 | Ikushima |
| 2015/0060613 A1 | 3/2015 | Lim |
| 2018/0259094 A1 | 9/2018 | Jung |

* cited by examiner

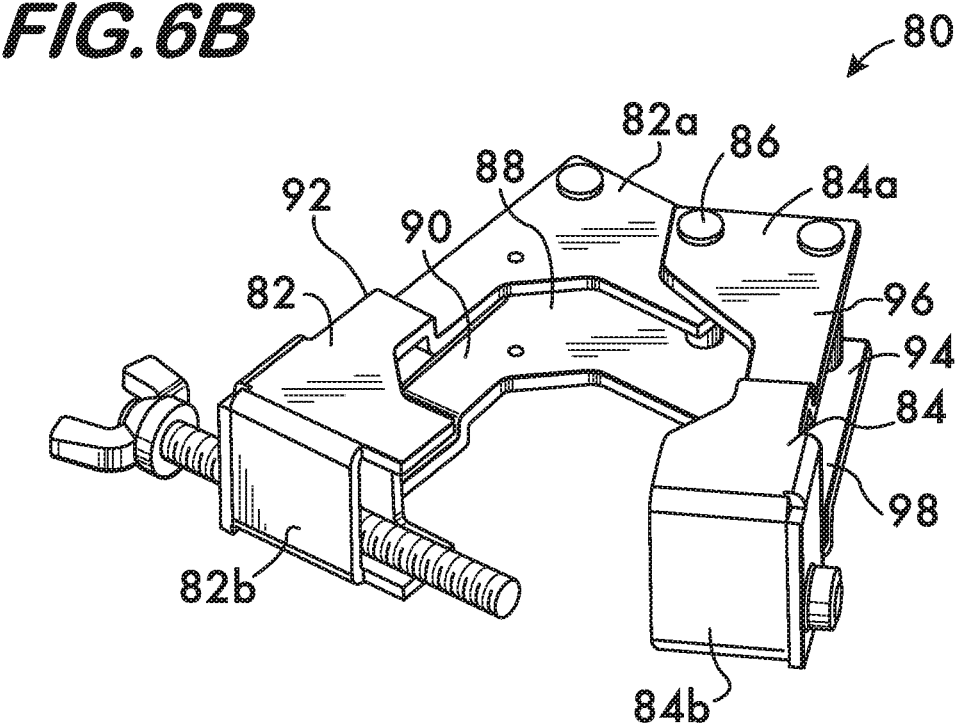
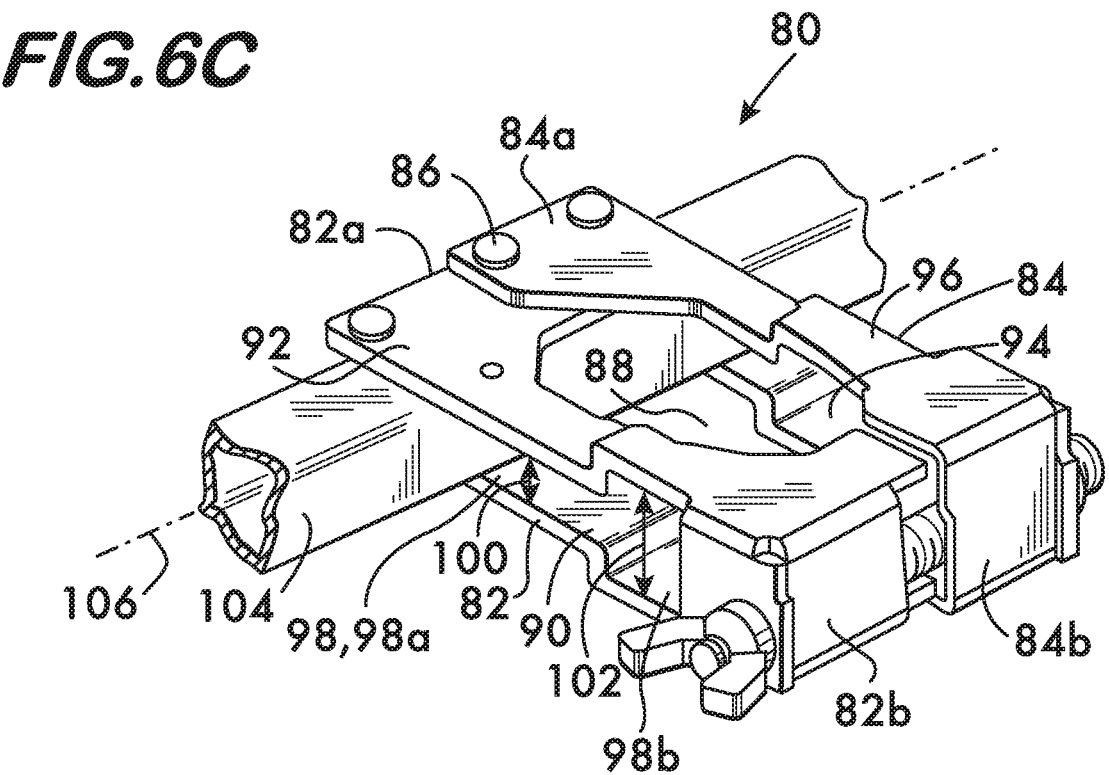

REVERSIBLE BRACKET

CROSS REFERENCE TO RELATED APPLICATIONS

This application is based upon and claims benefit of priority to U.S. Provisional Application No. 62/780,483, filed on Dec. 17, 2018 which application is hereby incorporated by reference herein.

FIELD OF THE INVENTION

The invention concerns brackets for securing items to a support.

BACKGROUND

FIG. 1 shows an example assembly 10 according to the prior art wherein a bracket 12 is used to secure an item 14 to a support 16. In this example, the assembly 10 is a fire suppression sprinkler system comprising a riser 18 and a branch pipe 20 attached to a beam 22 of a structure, such as a warehouse, office building, hotel or other edifice. A saddle coupling 24 connects one end of a flexible hose 26 to the branch pipe 20, the other end being attached to the item 14, in this example a sprinkler reducer. Sprinkler reducer 14 is connected to a heat triggered sprinkler 28. Most of the weight of the flexible hose 26, bracket 12, reducer 14 and sprinkler 28 is borne on the support 16, in this example a cross member which extends between rails 36. Rails 36 may be horizontally oriented within the building structure, for example, as part of a ceiling, or vertically oriented as part of a wall within the building structure.

Because the bracket's latching mechanism 30 is asymmetric, it is advantageous to have the ability to change the orientation of the bracket 12 so that it can be unlatched, opened, closed and latched from a position either below or above the bracket during installation of the item 14. If a bracket 12 according to the prior art is installed in an assembly, and it is desired to invert the bracket, orient the bracket horizontally, or change the side of the bracket on which the reducer and sprinkler are positioned, the technician must remove the cross member 16 from rails 36, slide the bracket off of the cross member, flip the bracket 90° or 180°, slide the bracket back onto the cross member and reattach the cross member to the rails. There is clearly a need for a bracket wherein the orientation may be readily changed without extensive disassembly.

SUMMARY

The invention concerns a bracket for mounting an item to a cross member. In one example embodiment the bracket comprises a base defining an opening for receiving the item. An arm is movably mounted on the base. The arm is movable between an open position, wherein the arm is not overlying the opening and thereby allowing access thereto, and a closed position, wherein the arm overlies the opening to capture the item between the arm and the base. By way of example the base comprises first and second sidewalls arranged in spaced apart relation from one another. Further by way of example, a back wall may extend between the first and second sidewalls. The back wall and the first and second sidewalls form a channel. A first portion of the channel has a first width measured between the first and second sidewalls at a point proximate to the back wall, and a second portion of the channel has a second width measured between the first and second sidewalls at a point distal to the back wall. The second width is greater than the first width.

In a specific example embodiment of a bracket, the opening is defined by the first and second sidewalls comprising the second portion of the channel. Further by way of example, the first channel portion may have a rectangular cross section. By way of example, the first channel portion may comprise two sidewalls arranged in parallel, spaced apart relation. In another example, a first end of the arm may be hingedly mounted on the base for pivoting motion between the open and the closed positions.

An example bracket embodiment may further comprise a latch mounted on a second end of the arm in spaced relation to the first end. A shaft is mounted on the base. The shaft is movable relatively to the base between a first position engaging the latch, thereby retaining the arm in the closed position, and a second position disengaged from the latch, thereby permitting the arm to pivot into the open position. In an example embodiment the shaft threadedly engages the base. The shaft may be movable between the first and second positions by rotating the shaft about a longitudinal axis of the shaft. In an example embodiment, the latch comprises a surface engageable by the shaft. The surface may be angularly oriented with respect to the longitudinal axis such that motion of the shaft into the first position forces the arm into the closed position.

The invention further encompasses a combination of a cross member and a bracket for mounting an item to the cross member. In one example embodiment the bracket comprises a base defining an opening for receiving the item. An arm is movably mounted on the base. The arm is movable between an open position, wherein the arm is not overlying the opening and thereby allowing access thereto, and a closed position, wherein the arm overlies the opening to capture the item between the arm and the base. By way of example the base comprises first and second sidewalls arranged in spaced apart relation from one another. A back wall may extend between the first and second sidewalls. The back wall and the first and second sidewalls form a channel. A first portion of the channel has a first width measured between the first and second sidewalls at a point proximate the back wall. The first width is sized so that the first portion of the channel receives the cross member in engagement sufficient to prevent rotation of the bracket about a longitudinal axis of the cross member. A second portion of the channel has a second width measured between the first and second sidewalls at a point distal to the back wall. The second width is sized to permit rotation of the bracket about the longitudinal axis when the cross member is positioned within the second portion of the channel.

In an example embodiment the opening is defined by the first and second sidewalls comprising the second portion of the channel. In a further example embodiment, the first channel portion has a rectangular cross section and the cross member has a rectangular cross section. In a particular example embodiment, the cross member has an outer dimension equal to the first width.

By way of example, a first end of the arm may be hingedly mounted on the base for pivoting motion between the open and the closed positions. An example embodiment further comprises a latch mounted on a second end of the arm in spaced relation to the first end. A shaft is mounted on the base. The shaft is movable relatively to the base between a first position engaging the latch, thereby retaining the arm in the closed position, and a second position disengaged from the latch, thereby permitting the arm to pivot into the open position. By way of example the shaft may threadedly engage the base. The shaft is then movable between the first and second positions by rotating the shaft about a longitudinal axis of the shaft. In an example embodiment the latch comprises a surface engageable by the shaft. The surface may be angularly oriented with respect to the longitudinal axis such that motion of the shaft into the first position forces the arm into the closed position.

The invention further encompasses a bracket for mounting an item to a cross member. In an example embodiment the bracket comprises a first arm having first and second ends oppositely disposed and a second arm having first and second ends oppositely disposed. A hinge pin extends between the first ends of the first and second arms thereby pivotably attaching the arms to one another. An opening is defined between the arms for receiving the item. The arms are movable between an open position wherein the second ends of the arms are spaced apart from one another thereby allowing access to the opening, and a closed position wherein the second ends are proximate to one another thereby capturing the item between the arms. Each of the first and second arms comprises respective first and second sidewalls arranged in spaced apart relation from one another. The first and second sidewalls of the first and second arms form a channel therebetween. A first portion of the channel has a first width measured between the first and second sidewalls at a point proximate to the hinge pin, a second portion of the channel has a second width measured between the first and second sidewalls at a point distal to the hinge pin. The second width is greater than the first width.

The invention also includes, in combination, a cross member and a bracket for mounting an item to the cross member. In an example embodiment the bracket comprises a first arm having first and second ends oppositely disposed, and a second arm having first and second ends oppositely disposed. A hinge pin extends between the first ends of the first and second arms thereby pivotably attaching the arms to one another. An opening is defined between the arms for receiving the item. The arms are movable between an open position wherein the second ends of the arms are spaced apart from one another thereby allowing access to the opening, and a closed position wherein the second ends are proximate to one another thereby capturing the item between the arms. Each of the first and second arms comprises respective first and second sidewalls arranged in spaced apart relation from one another. The first and second sidewalls of the first and second arms form a channel therebetween. A first portion of the channel has a first width measured between the first and second sidewalls at a point proximate the hinge pin. The first width is sized so that the first portion of the channel receives the cross member in engagement sufficient to prevent rotation of the bracket about a longitudinal axis of the cross member. A second portion of the channel has a second width measured between the first and second sidewalls at a point distal to the hinge pin. The second width is sized to permit rotation of the bracket about the longitudinal axis when the cross member is positioned within the second portion of the channel.

The invention also encompasses a method of reorienting a bracket mounted on a cross member. In one example embodiment the method comprises:

moving the bracket so that the cross member is positioned in a wide channel portion of the bracket, the wide channel portion having a width sufficient to permit rotation of the bracket about a longitudinal axis of the cross member;

rotating the bracket about the longitudinal axis of the cross member to a desired orientation; and moving the bracket so that the cross member is received within a narrow channel portion of the bracket, the narrow channel portion having a width sufficient to engage the cross member and prevent rotation of the bracket about the longitudinal axis of the cross member.

BRIEF DESCRIPTION OF THE DRAWINGS

FIGS. 6B and 6C are isometric views of another example embodiment of a bracket according to the invention.

DETAILED DESCRIPTION

Figure 2:
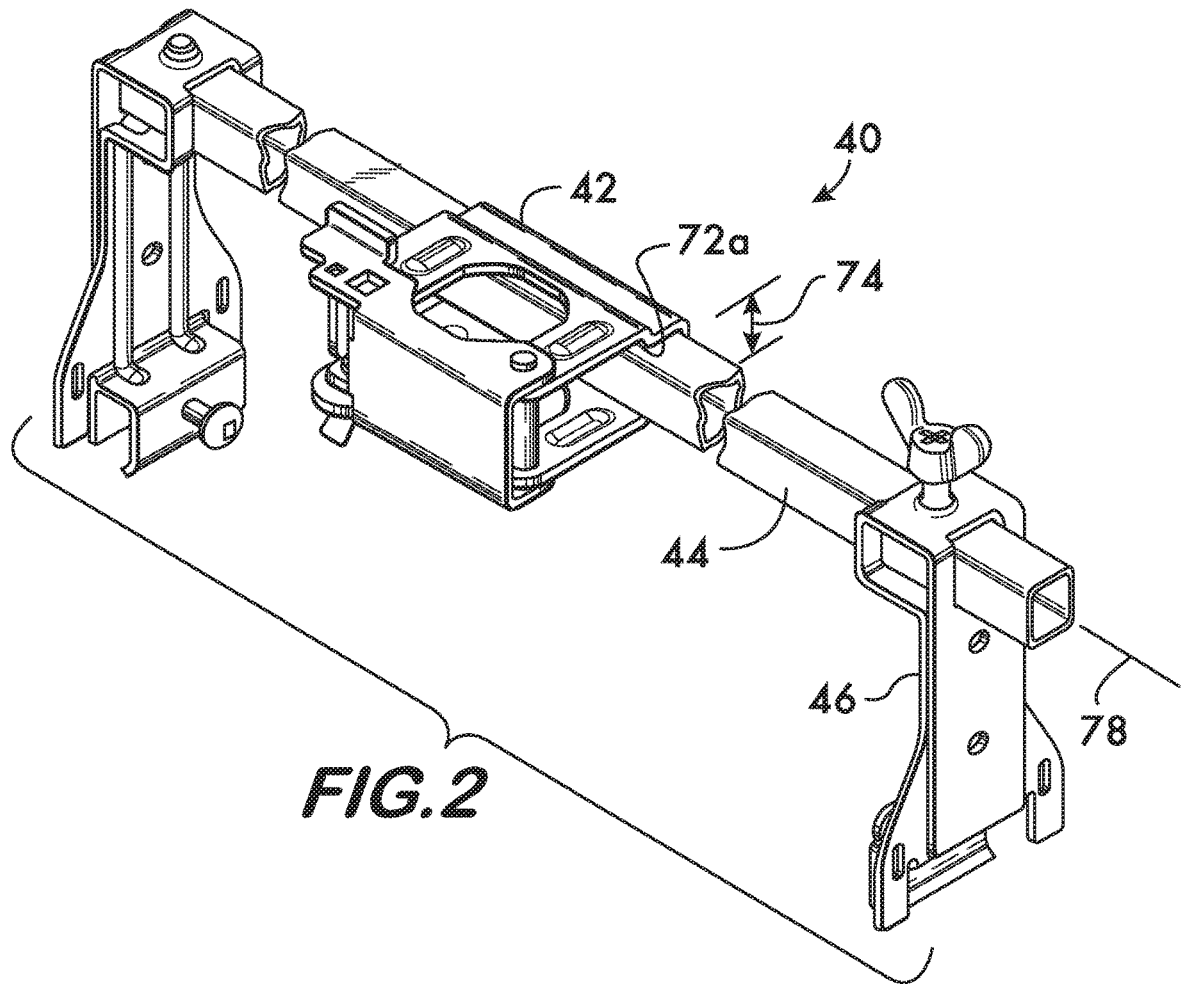
FIG. 2 is an isometric view of an example combination of bracket and cross member according to the invention.

FIG. 2 shows an example combination 40 according to the invention comprising a bracket 42 mounted on a cross member 44. Cross member 44 is mounted on attachments 46 which permit the combination to be mounted on a structure, such as horizontally oriented rails comprising a grid used to support a ceiling, or vertically oriented rails comprising a wall (not shown).

Figure 3:
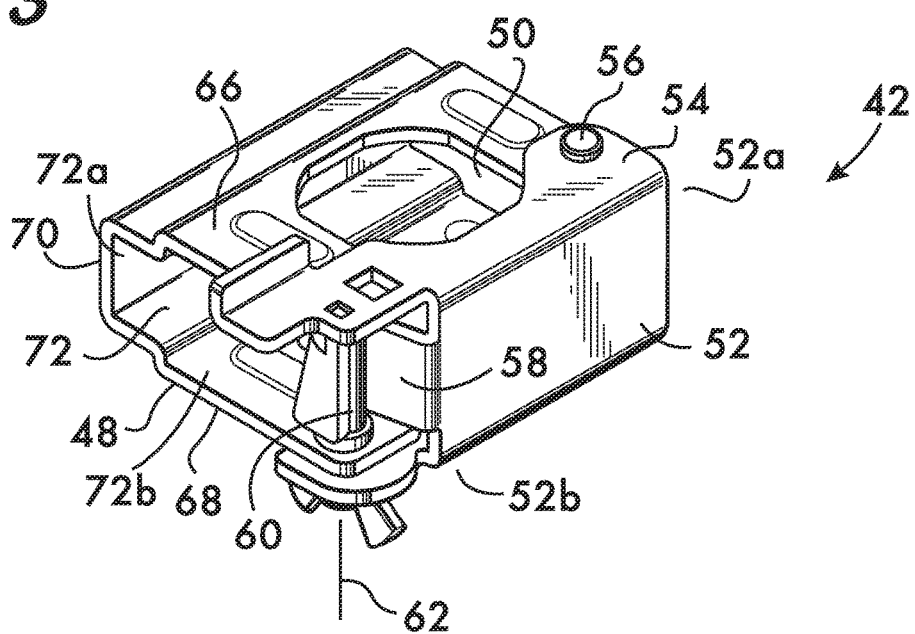
FIG. 3 is an isometric view of an example bracket according to the invention.
Figure 4:
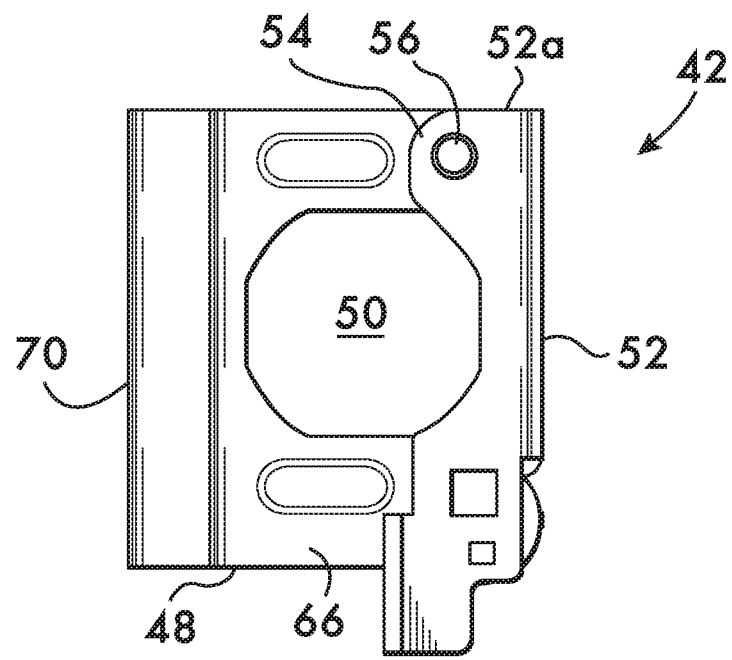
FIG. 4 is a plan view of the bracket shown in FIG. 3.
Figure 5:
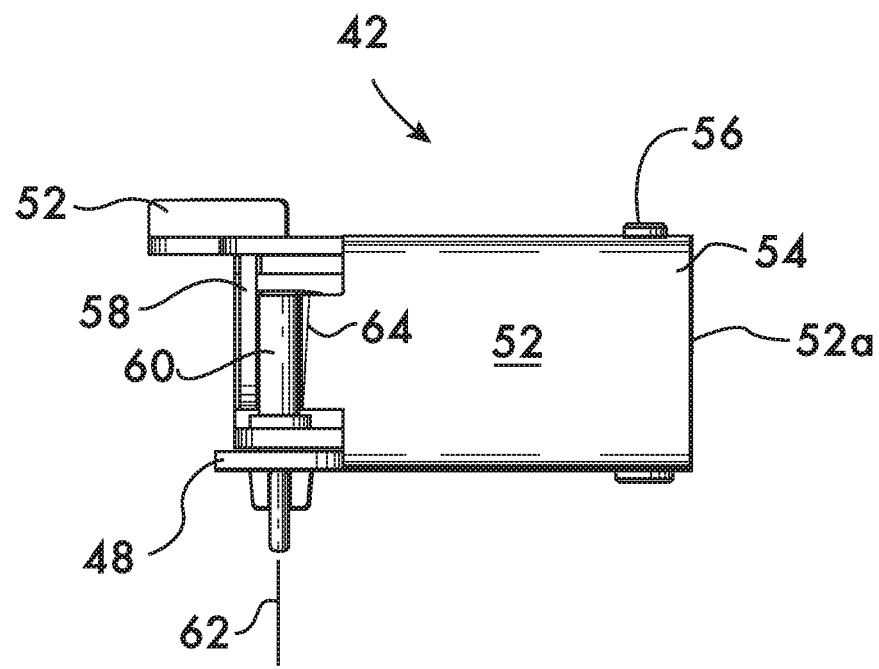
FIG. 5 is a front view of the bracket shown in FIG. 3.
Figure 6:
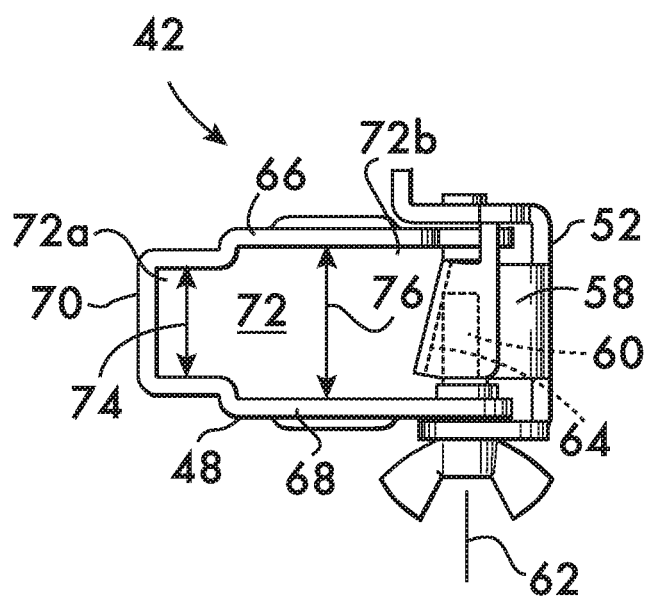
FIG. 6 is a side view of the bracket shown in FIG. 3.

FIGS. 3 and 4 show the example bracket 42 in detail. In this example, bracket 42 comprises a base 48 which defines an opening 50 which receives an item (not shown) to be secured to the cross member 44. An arm 52 is attached to the base 48, the arm being movable between a closed position (shown) wherein the arm overlies the opening 50 to capture the item between itself and the base 48, and an open position wherein the arm 52 does not overlie the opening 50, thereby providing access to it for positioning the item on the bracket 42. In this example, a first end 52a of arm 52 is mounted to the base 48 on a hinge 54 comprising a hinge pin 56 (see also FIG. 5). Hinge 54 permits the arm 52 to pivot about the hinge pin 56 between the open and closed position. As shown in FIGS. 3 and 6, arm 52 is secured in the closed position by a latch 58 mounted on a second end 52b of arm 52. A shaft 60 is mounted on base 48 in a position where it can engage the latch 58. Shaft 60 is movable relatively to the base between a first position (shown) where it engages latch 58 to retain the arm 52 in the closed position, and a second position disengaged from the latch 58, thereby permitting the arm 52 to pivot into the open position where the bracket 42 can receive an item. In this example shaft 60 is threaded with helical screw threads which engage compatible screw threads on the base 48, thus permitting the shaft to move between the first and second positions by rotating it about its longitudinal axis 62. In this example latch 58 comprises a surface 64 engageable by shaft 60. As shown in FIGS. 5 and 6, the surface 64 is angularly oriented with respect to the longitudinal axis 62 of the shaft such that motion of the shaft 60 into the first position engaging the latch 58 forces the arm 52 into the closed position. This arrangement of shaft 60 and surface 64 is advantageous because it permits the arm 52 to be drawn toward and against the item in a position so as to capture the item within the opening 50 between the arm 52 and the cross member 44 to lock the item in place within the combination 40.

As shown in FIGS. 3 and 6, base 48 comprises first and second sidewalls 66 and 68 arranged in spaced apart relation from one another. A back wall 70 extends between the first and second sidewalls 66 and 68 and together the sidewalls and back wall form a channel 72. A first portion 72*a* of channel 72, which is located proximate to the back wall 70, has a first width 74 measured between the first and second sidewalls 66 and 68. First width 74 is measured at a point proximate to the back wall 70. A second portion 72*b* of the channel 72, distal to the back wall 70, has a second width 76 measured between the first and second sidewalls 66 and 68. Second width 76 is measured at a point distal to the back wall 70. As shown in FIGS. 3 and 6, the second width 76 is greater than the first width 74. In this example, as shown in FIG. 2, the first width 74 is sized so that the first portion 72*a* of channel 72 receives the cross member 44 in an engagement sufficient to prevent rotation of the bracket 42 about the longitudinal axis 78 of cross member 44.

Figure 6A:
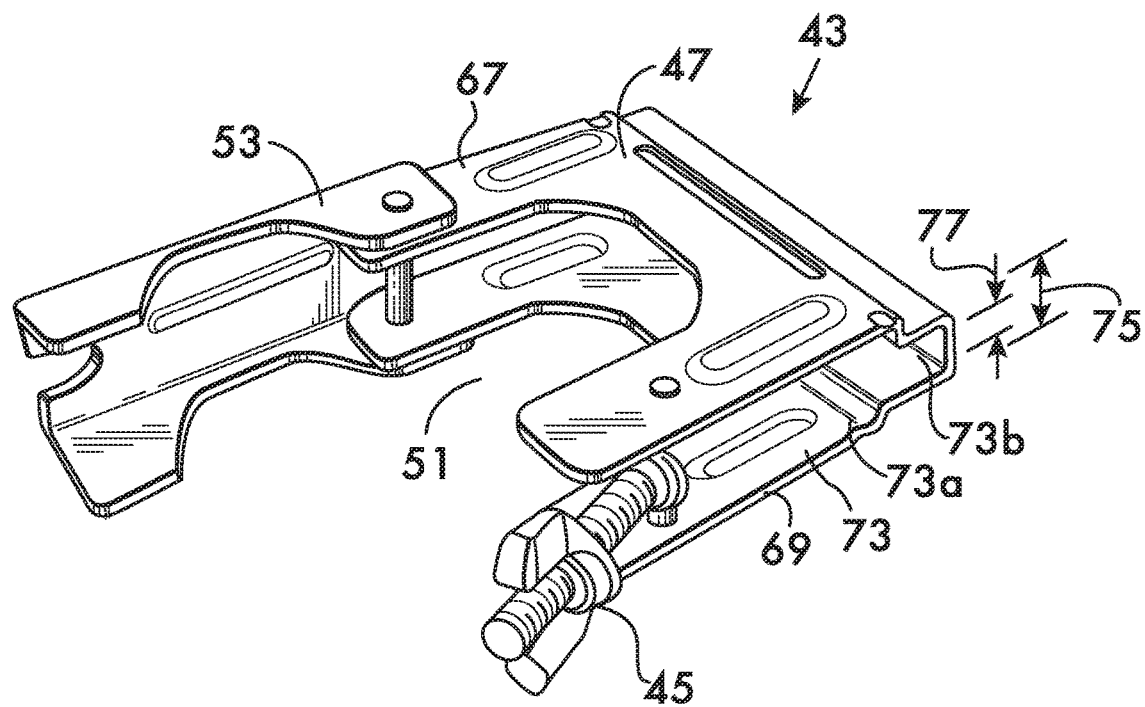
FIG. 6A is an isometric view of another example embodiment of a bracket according to the invention.

FIG. 6A shows another example embodiment of a bracket 43 according to the invention. Bracket 43 also comprises first and second sidewalls 67 and 69 which define a channel 73 having portions 73*a* and 73*b* of different respective widths 75 and 77, the width 75 of channel portion 73*a* sized to permit rotation of bracket 43 about cross member 44 (not shown), the width 77 of channel portion 73*b* sized to engage the cross member and prevent rotation of bracket 43 about the cross member. Example bracket 43 comprises a hinge mounted arm 53 which closes to overlie the bracket opening 51. The arm 53 is secured using a pivoting bolt and wingnut 45 attached to the bracket base portion 47.

Figure 1:
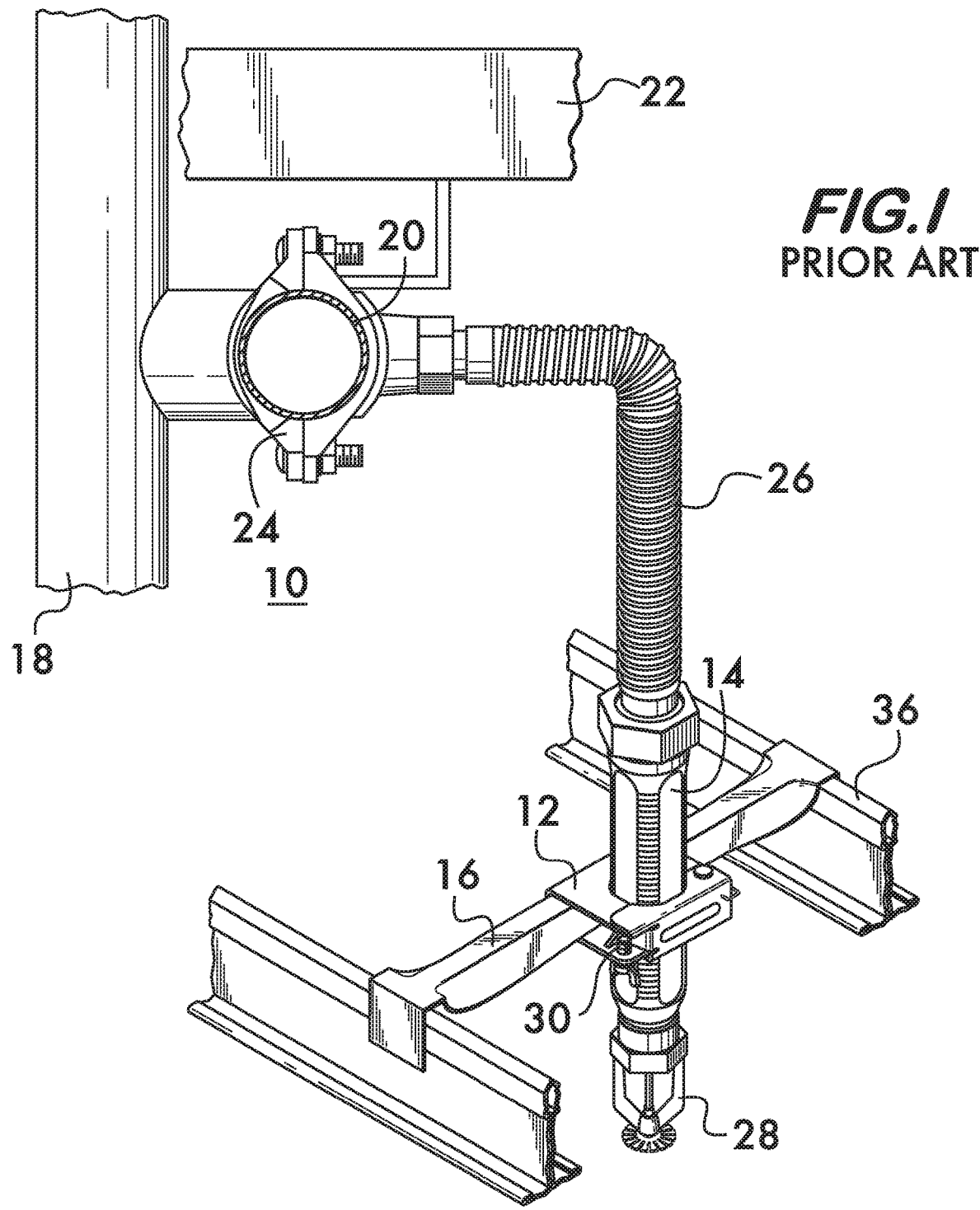
FIG. 1 is an isometric view of a bracket used in an assembly to secure an item to a support according to the prior art.

FIGS. 6B and 6C show another example embodiment of a bracket 80 according to the invention. Bracket 80 comprises first and second arms 82 and 84. Arm 82 has first and second ends 82*a* and 82*b* and arm 84 has first and second ends 84*a* and 84*b*. A hinge pin 86 extends between the first ends 82*a* and 84*a* of the arms 82 and 84, thereby pivotably attaching the arms to one another. The arms 82 and 84 define an opening 88 for receiving an item, such as a sprinkler reducer 14 (not shown, see FIG. 1). The arms 82 and 84 are furthermore movable between an open position (FIG. 6B), wherein second ends 82*b* and 84*b* are spaced apart from one another thereby allowing access to opening 88, and a closed position (FIG. 6C), wherein the second ends 82*b* and 84*b* are proximate one another thereby capturing the item between the arms. Each arm 82 and 84 comprises respective first and second sidewalls 90 and 92 (first arm 82), and 94 and 96 (second arm 84). The sidewalls 90, 92, 94 and 96 form a channels 98 therebetween. A first portion 98*a* of the channel 98 has a first width 100 measured between the first and second sidewalls at a point proximate to the hinge pin 86, and a second portion 98*b* of the channel 98 has a second width 102 measured at a point distal to the hinge pin 86. The second width 102 is greater than the first width. The first width 100 is sized so that the first portion 98*a* of channel 98 receives the cross member 104 in engagement sufficient to prevent rotation of the bracket 80 about the longitudinal axis 106 of the cross member when the cross member is positioned within the first portion 98*a* of channel 98. The second width 102 is sized to permit rotation of the bracket 80 about longitudinal axis 106 when the cross member is positioned within the second portion 98*b* of channel 98.

It is advantageous to match the cross sectional shape of the channel portion 72*a* to the cross sectional shape of the cross member 44 on at least two sides of the cross member. In this example, both the channel portion 72*a* and the cross member 44 have rectangular cross sectional shapes. It is also advantageous if, as shown, the first width 74 of the channel portion 72*a* is equal to an outer dimension of the cross member 44. Other shapes are also feasible, however, matching the cross sectional shapes and dimensions as shown permits locking engagement between the bracket 42 and the cross member 44.

Figure 7:
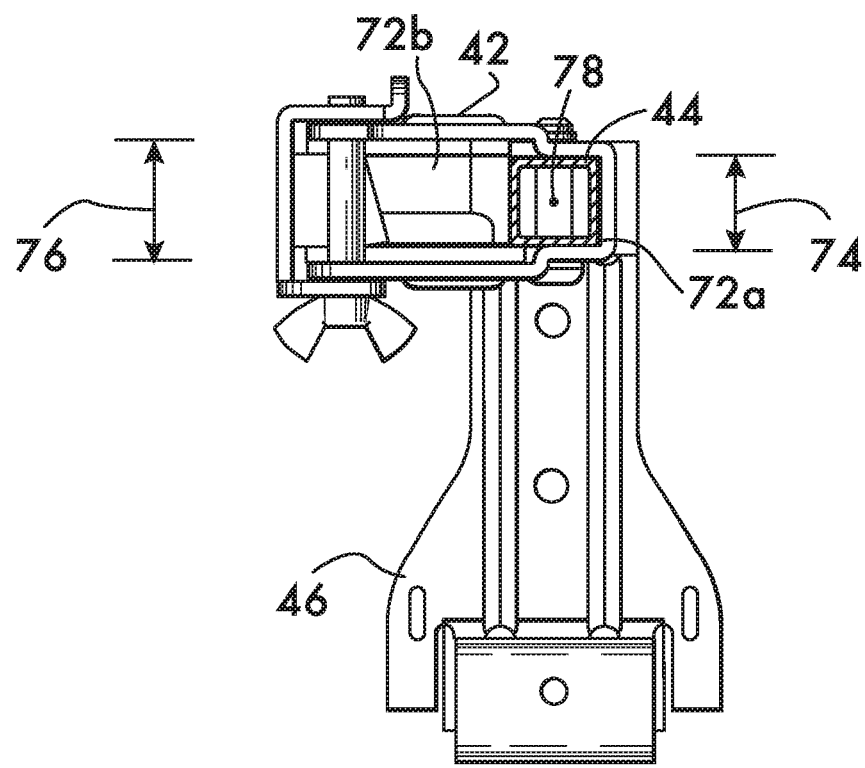
FIGS. 7-13 and 10A show side views depicting an example of a sequence of steps for inverting a bracket on a cross member according to the invention.
Figure 8:
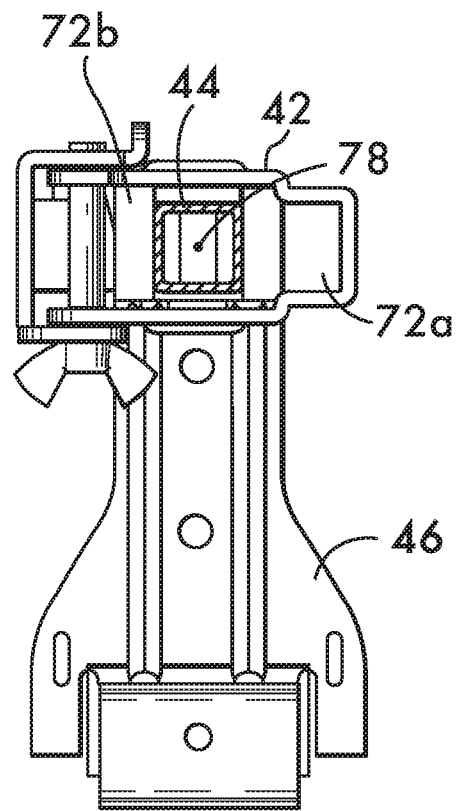
Figure 9:
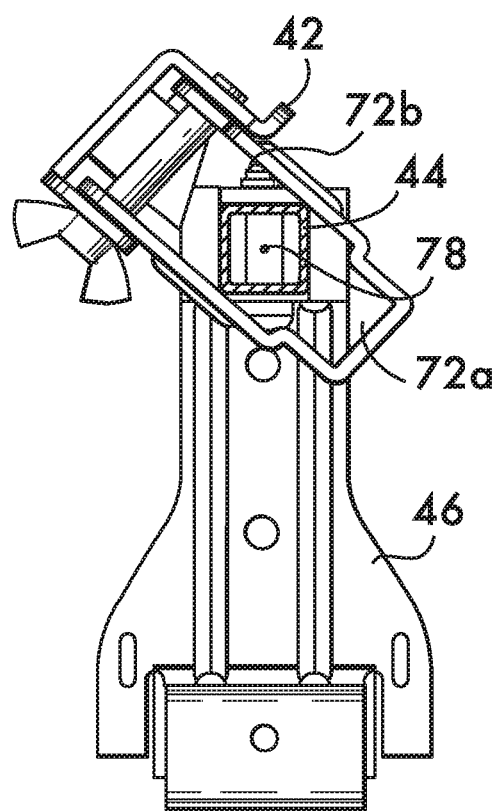
Figure 10:
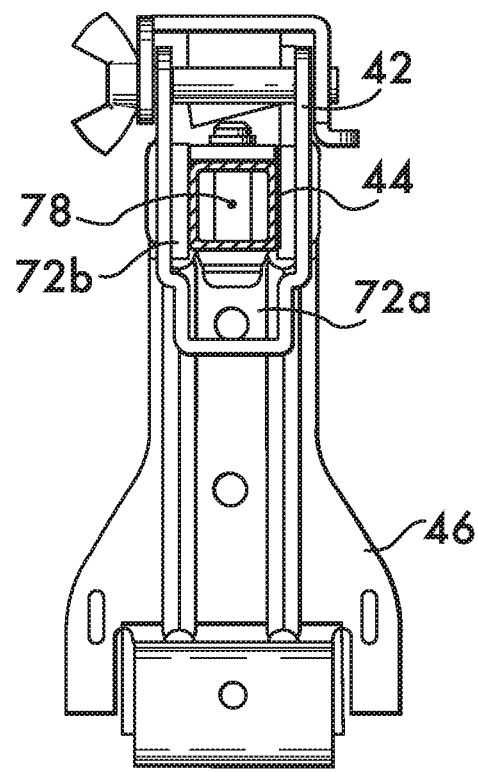
Figure 11:
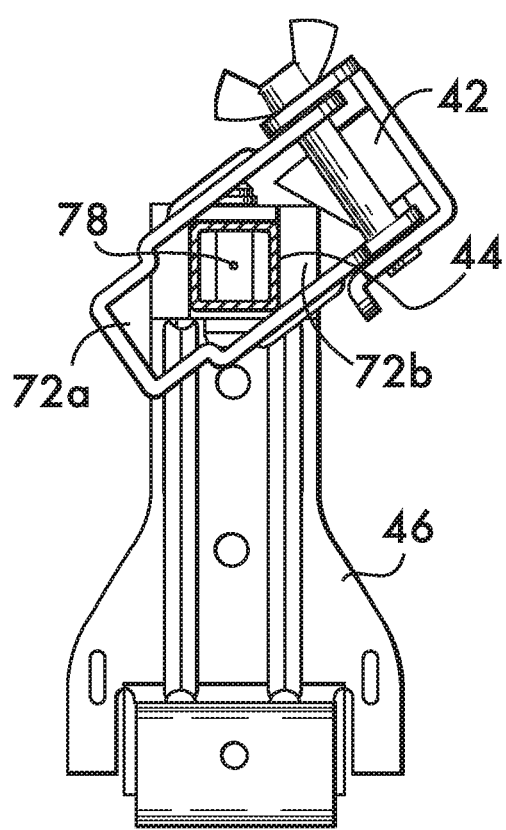
Figure 10A:
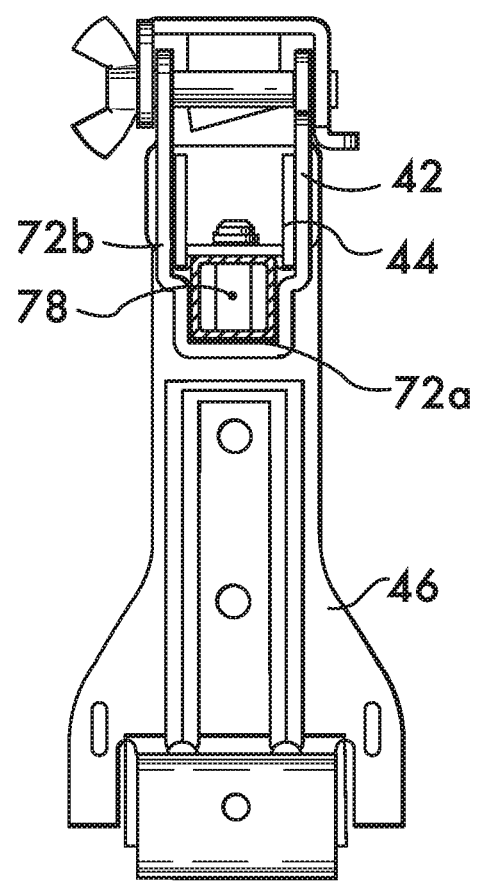
Figure 12:
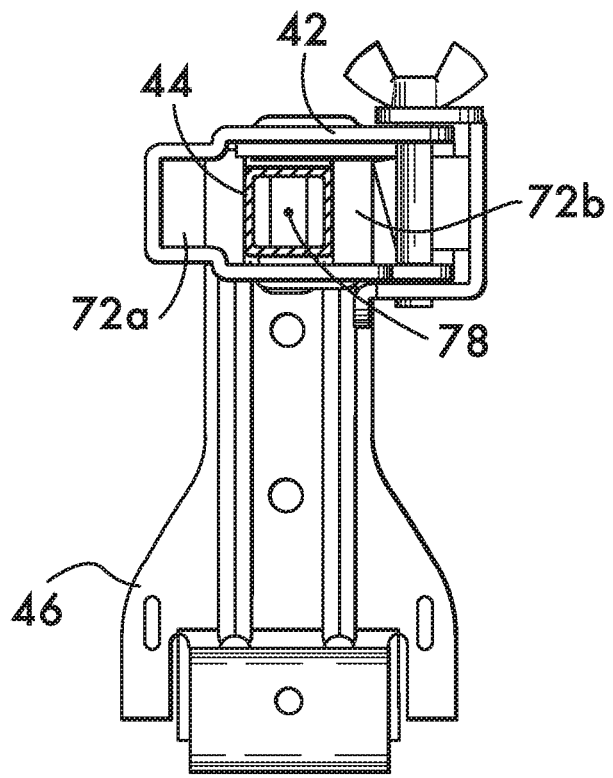
Figure 13:
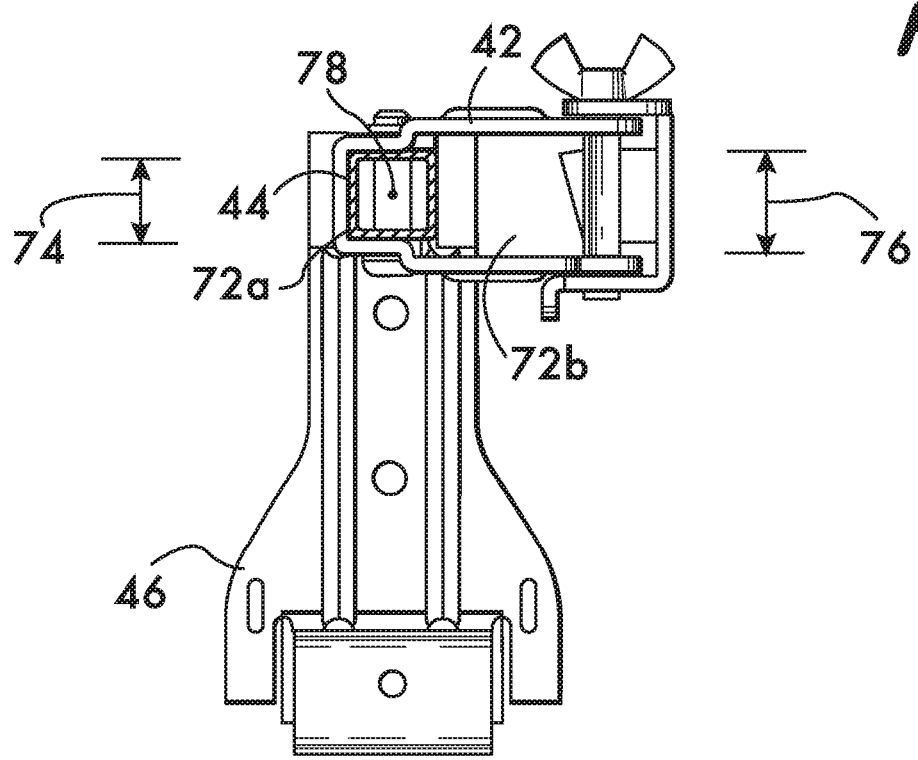

As shown in FIG. 3, the second channel portion 72*b* defines the opening 50 which receives an item. As further shown in FIGS. 7-13, the width 76 of second channel portion 72*b* is sized to permit rotation of bracket 42 about the longitudinal axis 78 of the cross member 44 when the cross member is positioned within second channel portion 72*b*. When it is desired to change the orientation to permit manipulation of the shaft 60 from above or from either side of the bracket 42, the bracket is moved so that cross member 44 is positioned within the wider second channel portion 72*b* (FIGS. 7-8). The bracket 42 may then be rotated in 90° increments about the longitudinal axis 78 of cross member 44 (FIGS. 9-12) because the second width 76 of the second channel portion 72*b* is large enough to permit the rotation. As shown in FIG. 13, the bracket 42 may be fixed in its new orientation (rotated 180°) by inserting the cross member 44 into the narrow first channel portion 72*a*, which has a width 74 sufficient to prevent rotation of the bracket 42 about the longitudinal axis 78 of the cross member 44 when the cross member is received within the narrow channel portion. If, however, it is desired to rotate bracket 42 through only 90°, as would be advantageous if the attachments 46 were mounted on vertically oriented rails, then, as shown in FIG. 10A, bracket 42 may be fixed in this position (rotated 90°) again by inserting the cross member 44 into the narrow first channel portion 72*a*. In certain example embodiments of the combination 40 the width 74 may be "equal" to an outer dimension of the cross member 44, where "equal" permits a slip-fit between bracket and cross member so that the bracket can slide along the cross member easily. Tighter fits between bracket and cross member are also feasible in other example embodiments. Using the combination bracket 42 and cross member 40 according to the invention allows the bracket to be flipped in 90° increments to change the orientation of the bracket by 90°, 180° or 270° without removing the bracket from the cross member and thus allow the bracket's orientation to be adjusted without disassembly, either before or once the combination 40 is installed on a structure.

What is claimed is:

1. A bracket for mounting an item to a cross member, said bracket comprising:

a base defining an opening for receiving said item;

an arm movably mounted on said base, said arm being movable between an open position wherein said arm is not overlying said opening and thereby allowing access thereto, and a closed position wherein said arm overlies said opening to capture said item between said arm and said base; wherein said base comprises:

first and second sidewalls arranged in spaced apart relation from one another;

a back wall extending between said first and second sidewalls, said back wall and said first and second sidewalls forming a channel, a first portion of said channel having a first width measured between said first and second sidewalls at a point proximate to said back wall, a second portion of said channel having a second width measured between said first and second sidewalls at a point distal to said back wall, said second width being greater than said first width.

2. The bracket according to claim 1, wherein said opening is defined by said first and second sidewalls comprising said second portion of said channel.

3. The bracket according to claim 1, wherein said first channel portion has a rectangular cross section.

4. The bracket according to claim 1, wherein said first channel portion comprises two sidewalls arranged in parallel, spaced apart relation.

5. The bracket according to claim 1, wherein a first end of said arm is hingedly mounted on said base for pivoting motion between said open and said closed positions.

6. The bracket according to claim 5, further comprising:
a latch mounted on a second end of said arm in spaced relation to said first end;
a shaft mounted on said base, said shaft being movable relatively to said base between a first position engaging said latch, thereby retaining said arm in said closed position, and a second position disengaged from said latch, thereby permitting said arm to pivot into said open position.

7. The bracket according to claim 6, wherein said shaft threadedly engages said base, said shaft being movable between said first and second positions by rotating said shaft about a longitudinal axis of said shaft.

8. The bracket according to claim 7, wherein said latch comprises a surface engageable by said shaft, said surface being angularly oriented with respect to said longitudinal axis such that motion of said shaft into said first position forces said arm into said closed position.

9. In combination, a cross member and a bracket for mounting an item to said cross member, said bracket comprising:
a base defining an opening for receiving said item;
an arm movably mounted on said base, said arm being movable between an open position wherein said arm is not overlying said opening and thereby allowing access thereto, and a closed position wherein said arm overlies said opening to capture said item between said arm and said base; wherein said base comprises:
first and second sidewalls arranged in spaced apart relation from one another;
a back wall extending between said first and second sidewalls, said back wall and said first and second sidewalls forming a channel, a first portion of said channel having a first width measured between said first and second sidewalls at a point proximate said back wall, said first width being sized so that said first portion of said channel receives said cross member in engagement sufficient to prevent rotation of said bracket about a longitudinal axis of said cross member, a second portion of said channel having a second width measured between said first and second sidewalls at a point distal to said back wall, said second width being sized to permit rotation of said bracket about said longitudinal axis when said cross member is positioned within said second portion of said channel.

10. The combination according to claim 9, wherein said opening is defined by said first and second sidewalls comprising said second portion of said channel.

11. The combination according to claim 9, wherein said first channel portion has a rectangular cross section and said cross member has a rectangular cross section.

12. The combination according to claim 9, wherein said cross member has an outer dimension equal to said first width.

13. The combination according to claim 9, wherein a first end of said arm is hingedly mounted on said base for pivoting motion between said open and said closed positions.

14. The combination according to claim 13, further comprising:
a latch mounted on a second end of said arm in spaced relation to said first end;
a shaft mounted on said base, said shaft being movable relatively to said base between a first position engaging said latch, thereby retaining said arm in said closed position, and a second position disengaged from said latch, thereby permitting said arm to pivot into said open position.

15. The combination according to claim 14, wherein said shaft threadedly engages said base, said shaft being movable between said first and second positions by rotating said shaft about a longitudinal axis of said shaft.

16. The combination according to claim 15, wherein said latch comprises a surface engageable by said shaft, said surface being angularly oriented with respect to said longitudinal axis such that motion of said shaft into said first position forces said arm into said closed position.

17. A method of reorienting a bracket mounted on a cross member, said method comprising:
moving said bracket so that said cross member is positioned in a wide channel portion of said bracket, said wide channel portion having a width sufficient to permit rotation of said bracket about a longitudinal axis of said cross member;
rotating said bracket about said longitudinal axis of said cross member to a desired orientation;
moving said bracket so that said cross member is received within a narrow channel portion of said bracket, said narrow channel portion having a width sufficient to engage said cross member and prevent rotation of said bracket about said longitudinal axis of said cross member.

18. A bracket for mounting an item to a cross member, said bracket comprising:
a first arm having first and second ends oppositely disposed;
a second arm having first and second ends oppositely disposed;
a hinge pin extending between said first ends of said first and second arms thereby pivotably attaching said arms to one another;
an opening being defined between said arms for receiving said item, said arms being movable between an open position wherein said second ends of said arms are spaced apart from one another thereby allowing access to said opening, and a closed position wherein said second ends are proximate to one another thereby capturing said item between said arms;
each of said first and second arms comprising respective first and second sidewalls arranged in spaced apart relation from one another;
said first and second sidewalls of said first and second arms forming a channel therebetween, a first portion of said channel having a first width measured between said first and second sidewalls at a point proximate to said hinge pin, a second portion of said channel having a second width measured between said first and second sidewalls at a point distal to said hinge pin, said second width being greater than said first width.

19. In combination, a cross member and a bracket for mounting an item to said cross member, said bracket comprising:

a first arm having first and second ends oppositely disposed;

a second arm having first and second ends oppositely disposed;

a hinge pin extending between said first ends of said first and second arms thereby pivotably attaching said arms to one another;

an opening being defined between said arms for receiving said item, said arms being movable between an open position wherein said second ends of said arms are spaced apart from one another thereby allowing access to said opening, and a closed position wherein said second ends are proximate to one another thereby capturing said item between said arms;

each of said first and second arms comprising respective first and second sidewalls arranged in spaced apart relation from one another;

said first and second sidewalls of said first and second arms forming a channel therebetween, a first portion of said channel having a first width measured between said first and second sidewalls at a point proximate said hinge pin, said first width being sized so that said first portion of said channel receives said cross member in engagement sufficient to prevent rotation of said bracket about a longitudinal axis of said cross member, a second portion of said channel having a second width measured between said first and second sidewalls at a point distal to said hinge pin, said second width being sized to permit rotation of said bracket about said longitudinal axis when said cross member is positioned within said second portion of said channel.

\* \* \* \* \*